United States Patent [19]

Sarma

[11] Patent Number: 5,719,218
[45] Date of Patent: Feb. 17, 1998

[54] WATER RESISTANT ELECTRICAL INSULATION COMPOSITIONS

[75] Inventor: Haridoss Sarma, Brampton, Canada

[73] Assignee: AT Plastics Inc., Ontario, Canada

[21] Appl. No.: 713,368

[22] Filed: Sep. 13, 1996

Related U.S. Application Data

[63] Continuation of Ser. No. 457,145, Jun. 1, 1995, abandoned.

[51] Int. Cl.$^6$ .................................................. C08K 5/3495
[52] U.S. Cl. ............................................ 524/100; 524/524
[58] Field of Search ........................................ 524/100, 524

[56] References Cited

U.S. PATENT DOCUMENTS

| | | | |
|---|---|---|---|
| 4,144,203 | 3/1979 | Ashcraft et al. | 252/63.2 |
| 4,820,755 | 4/1989 | Webster | 524/101 |
| 4,870,121 | 9/1989 | Bamji et al. | 524/91 |
| 5,300,545 | 4/1994 | Kazmierczak et al. | 524/102 |

FOREIGN PATENT DOCUMENTS

| | | |
|---|---|---|
| 2039894 | 10/1992 | Canada . |
| 166781 | 1/1986 | European Pat. Off. . |
| 63-226814 | 9/1988 | Japan . |

*Primary Examiner*—Kriellion S. Morgan
*Attorney, Agent, or Firm*—Cushman Darby & Cushman IP Group Pillsbury Madison & Sutro LLP

[57] ABSTRACT

An electrically insulating cross-linked polyethylene composition for use in high voltage electrical cables, said cross-linked polyethylene being obtained by cross-linking a composition consisting essentially of 98% w/w of a low density, peroxide cross-linkable polyethylene, 1–2% w/w of a terpolymer of ethylene, vinyl acetate and vinyl alcohol and at least 0.15% w/w of a sterically hindered amine stabiliser of said composition; said terpolymer being obtained from about 40–45% hydrolysis of an ethylene-vinyl acetate copolymer having a 20–30% w/w vinyl acetate content; and wherein said polyethylene and said terpolymer have substantially the same melt index. The cross-linked polyethylene compositions have improved resistance to moisture induced degradation.

4 Claims, No Drawings

WATER RESISTANT ELECTRICAL INSULATION COMPOSITIONS

This is a continuation of application Ser. No. 08/457,145, filed on Jun. 1, 1995, which was abandoned upon the filing hereof Ser. No. 08/713,368, Sep. 13, 1996.

FIELD OF THE INVENTION

This invention relates to polyethylene compositions for use as high voltage electrical cable insulation and more particularly to said insulation having enhanced resistance to moisture induced degradation.

BACKGROUND OF THE INVENTION

In the mid 1960% underground power distribution cables were insulated with high molecular weight polyethylene (HMWPE). Although PE is one of the most moisture resistant polymers available, these cables started to fail in service after three to four years. By the time these cables were ten years old, failure rates became a financial burden to electrical utilities and the lack of reliable service to consumers became an issue. Notwithstanding a lack of in-depth knowledge of the failure mechanisms, it was recognised that the insulation system deteriorated with time due to the combined action of moisture, temperature and electrical stress. Subsequently, insulation compositions of newer technologies, such as cross-linked polyethylene (XLPE) and ethylene propylene rubber (EPR) were introduced in the market place.

With the recognition that water is of primary concern in high molecular weight polyethylene (HMWPE) cable failures and with an objective to assure that cables operate reliably on an electric power utility system, the Association of Edison Illuminating Companies (AEIC), as a cable specification body, introduced an accelerated test to evaluate the effect of moisture directly on full size cables to determine a.c. breakdown strength and impulse strength of aged cables. Cable qualification tests were thus made very stringent with the aim to improve the operational reliability of a distribution network consisting of these cables and to guarantee a better performing cable in service.

The mechanism by which the electrical strength of cable insulation is reduced by moisture induced degradation is still not understood. Tree-like patterns, named water trees, which occur during accelerated aging and field aging of the cable insulation are generally believed to be responsible for this degradation process. These water trees comprise water-fried micro cavities, which originate inside the insulation, usually from a void, imperfection or a contaminant and grow in the electric field direction. The trees can also originate at the insulation interface with the semiconductive polymer compound applied as a shield between the conductor and insulation, and on top of the insulation. Water trees, once initiated, slowly develop and lead to a reduction in dielectric strength of the insulation. However, because of the lack of a proper definition of tree retardancy and a substantial correlation to the cable aging process, it is not evident or obvious that a water tree retardant insulation will automatically result in improved service reliability. For example, contrary to what would be expected of EPR—a non-water tree retardant insulation, cable insulated with EPR is more or equally reliable to the performance of an improved or tree retardant XLPE. This, however, did not impede a proliferation of fundamental studies on water tree growth.

Based on screening work employing moulded samples or model cables, numerous methods to improve the performance of XLPE insulation against dielectric deterioration by water tree generation and growth have been described in the literature. U.S. Pat. No. 4,144,202 issued Mar. 13, 1979, to Ashcraft et al relates to the inhibition of water tree growth by use of certain organosilane compounds. U.S. Pat. No. 4,206,260 describes compositions containing an effective mount of an alcohol containing 6–24 carbon atoms as being an efficient water and electrical tree retardant insulation. German patent 2,737,430 discloses that certain alkoxysilanes act as tree retardant additives in polyethylene insulation. European patent 0,166,781, published Jan. 8, 1986 to Sumitomo Electric Industries Limited describes a blend of ethylene and vinyl acetate copolymer as a water tree retardant material. Certain aliphatic carboxylic acid derivatives when incorporated in suitable mounts in XLPE are also reported to suppress water tree growth. Japanese application 63-226,814 published Sep. 21, 1988 and Canadian application 2,039,894 published Oct. 6, 1992 to Sarma et al disclose an insulation composition comprising a low density PE in admixture with an ethylene-vinyl acetate-vinyl alcohol copolymer as a possible water tree retardant composition.

It is also recognised in the industry that apart from moisture induced degradation of cable insulation, an additional gradual degradation in dry conditions leading to electrical tree initiation occurs at electric fields much lower than the breakdown strength of the insulation. U.S. Pat. No. 4,870,121 issued Sep. 26, 1989 to Bamji et al discloses the use of ultraviolet stabilisers, preferably in combination with reduced concentration of oxygen in the polymer, to significantly extend the time to initiation of electrical treeing by preventing photo-degradation of the polymer. It is, however, not obvious to one skilled in the electrical art that these additives or others cited in the literature for suppressing electrical trees would be stable and resistant to a moisture induced degradation process. Neither this patent nor any other teaches the possibility of UV light emission during a moisture induced degradation process, nor the effect of activation or deactivation or extraction of these stabilisers by moisture in the insulation. The process of conversion of water trees to electrical trees leading to the final breakdown of the insulation and the influence of these additives on this conversion process are other factors not taught by the prior art on electrical treeing.

There, thus, remains a need for a moisture resistant polyethylene composition for use in a high voltage electric cable, which, notwithstanding being a water tree retardant, should have a longer time to failure.

SUMMARY OF THE INVENTION

It is an object of the present invention to provide an improved electrical insulation composition for use in high voltage electrical cables having enhanced resistance to moisture induced degradation.

Accordingly, the invention provides in one aspect an electrically insulating cross-linked polyethylene composition for use in high voltage electrical cables, said cross-linked polyethylene being obtained by cross-lining a composition consisting essentially of 98% w/w of a low density, cross-linkable polyethylene, 1–2% w/w of a terpolymer of ethylene, vinyl acetate and vinyl alcohol and at least 0.15% w/w of a sterically hindered amine stabiliser; said terpolymer being obtained from about 40–45% hydrolysis of an ethylene-vinyl acetate copolymer having 20–30% w/w vinyl acetate content; and wherein said polyethylene and said terpolymer have substantially the same melt index.

The low density ethylene polymer (LDPE) of value in the practice of the invention has a density of about 900 to 950 kg/m³ (ASTM 1505 test procedure with conditioning as in ASTM D1248) and a melt index (MI) of about 0.5 to 10 decigrams per minute (ASTM D1238 test procedure). It may be made, for example, under high pressure using a tubular or autoclave reactor with any of the known free radical initiators or metallecene catalyses employed in olefin polymerization technology, or may be made under low pressure with any of the known transition metal catalyst systems such as Zeigler-Natta catalysts.

The ethylene-vinyl acetate-vinyl alcohol terpolymer of use in the practice of this invention will, hereinafter, be referred to as EVA(OH) terpolymer and is preferably obtained by the hydrolysis of ethylene-vinyl acetate (EVA) copolymer having a vinyl acetate (VA) content of approximately 25% w/w. Hydrolysis to give the terpolymer is carried out on the EVA copolymer in a reactive extrusion as a continuous process. Hydrolysis of the acetate group to the hydroxyl radical is to effect a minimum of 38% hydrolysis, preferably 40–45% hydrolysis, under hydrolysis conditions known to the art. The amount of the terpolymer used in the composition is preferably limited to a maximum of 2% w/w. The terpolymer preferably has a melt index matching as close as possible that of the ethylene polymer.

Sterically hindered amines of use in the invention are present in the insulation composition at a minimum of about 0.15% w/w, preferably about 0.3% w/w, and may be either low molecular weight, polymeric or graftable to the polyethylene.

Examples of polymeric sterically hindered amine light stabilizers (HALS) of use in the practice of the invention are compounds of the general formula:

1. HALS of Formula I:

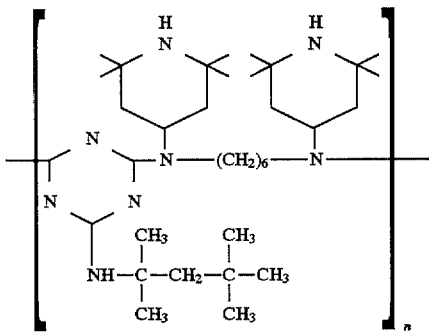

where n=2,000 to 3,500; having a melting point of 115° C.–150° C., density of 1.01 g/cm³ (20° C.) and a pH (at 100 g/l water) of 8.5.

2. HALS of Formula II: poly-6-morpholino-s-triazine=2, 4-diyl ((2,2,6,6-tetramethy-4-piperidyl)imino) hexamethyl((2,2,6,6-tetramethyl-4-piperidyl)imino) having a softening range of 110° C.–130° C. and volatility during thermogravimetric analysis (heating rate 10° C./minute), such that a 10% weight loss is observed at 340° C.

3. HALS of Formula III: having a formula $(C_{20}H_{52}N_4)n$ where n=1–12, and as further disclosed in U.S. Pat. No. 4,104,284 (1978) having a melting point of 93°–98° C. (199°–208° F.) and a molecular weight approximately 2000 average. As measured by thermogravimetric analysis, it exhibits essentially no weight loss up to 300° C. (572° F.).

Examples of such amines can be selected from the following:

AO-1 poly-(N-β-hydroxyethyl-2,2,6,6-tetra-methyl-4-hydroxy-piperidyl succinate)

AO-2 bis-2,2,6,6-tetramethyl-4-piperidyl sebecate

AO-3 2-hydroxy-4-n-octoxy-benzophenone AO-4. poly-{[6-(1,1,3,3-tetramethylbutyl)-imino]-1,3,5-triazine-2, 4-diyl][2-(2,2,6,6-tetramethylpiperidyl)-amino]-hexamethylene-[4-(2,2,6,6-tetramethylpiperidyl)-imino]}

AO-5 N,N'-bis[2,4-di(allylamino)-1,3,5-triazinyl-6]-N, N'-bis-(2,2,6,6-tetramethyl-peperidyl-4)-hexamethylene diamine The preferred hindered amine used for a favourable advantageous synergistic effect is AO-4—which is sold under the Trademark "Chimasorb 944", by Ciba-Geigy, Basle, Switzerland.

Chemical cross-linking agents, either alone or in combination with a co-agent, are used in appropriate amounts to cross-link the polymer insulation as would be well-known in the art. A preferred cross-linking agent is dicumyl peroxide. Other organic peroxides which can be employed are, for example, ditertiarybutyl peroxide (DTBP) and tertiarybutyl peracetate (TBPA).

The insulation composition of the invention preferably includes a further stabiliser such as the phenolic ester, sold under the Trademark "Irganox 245" by Ciba-Geigy, to obtain satisfactory cross-linking thermal stability.

Other additives which may be employed in the composition of the present invention include, for example, plasticisers, coupling agents, colorants and chelating agents.

Thus, this invention provides a synergistic combination of hydrolysed ethylene-vinyl acetate copolymer and a hindered amine light stabiliser as additive in a polyolefin dielectric composition.

In a further aspect the invention provides a high voltage electrical cable comprising an insulating layer of a cross-linked polyethylene composition as hereinabove defined.

The cable according to the invention may be manufactured according to known processes in the art wherein, a conducting core to be coated is pulled through a heated extrusion die, generally a cross-head die, and layers of conductor shield, insulation and insulation shield are applied to the core. The coated cable then passes through a high pressure vulcanisation system to cross-link the polymeric layers.

DESCRIPTION OF PREFERRED EMBODIMENTS

In order that the invention may be better understood preferred embodiments will now be described with reference to the following examples.

The insulation compositions of use in the present invention having surprisingly enhanced resistance to moisture induced degradation, of which water tree growth resistance forms only a part thereof, were tested to meet two standards. One standard was to verify the susceptibility to water treeing while simultaneously complying to all other electrical and non-electrical requirements stipulated by the industry standards such as AEIC Cable Qualification CS5-94. In addition, the expected service reliability standard was also verified by accelerated life time tests on real size cable as stipulated by industry standards.

Extra clean compounds with contaminants of size <2 mil, at less than 1 per 12 c.c., were used in all testing. To allow an efficient inspection of raw material insulation and also final inspection of the cable insulation in its integrity with other compounds such as conductor shield and insulation shield, the insulation compound was transparent after cross-linking. This transparency was examined under silicone oil heated to 120° C. When the cable composition was heated beyond the crystalline melting point of the insulation, it was rendered transparent and facilitated the optical examination of the quality of the interfaces between insulation and semiconductives.

One physical property which is relevant to service behaviour is the dielectric loss of the cable insulation at operating (25° C.–35° C.), emergency (90° C.) and short circuit (130° C.) conditions. AEIC specification calls for a maximum value of 0.5% at any of these measurement temperatures. Insulation compositions with dielectric loss values greater than 0.5 % are not considered suitable for practical service applications.

Cable qualifications also deal with an accelerated water tree test looking at the changes in the dielectric strength after 120 days of aging. The cables are aged in water filled pipes under an electric field of 150 volts/mil with a load current heating the conductor to 90° C. for 8 hours and with the load current being off for the next 16 hours. These conditions are maintained for 120 days after which the a.c. breakdown strength is measured. The specification requirement is 620 volts/mil before aging and 260 volts/mil after aging, signifying the necessity of an improved products for service reliability.

Accelerated life tests are conducted with the cables in water-filled tanks. Fifteen kV rated cables with 0.175 in (4.4 mm) of insulation are energised to four times the operating voltage in a set of twelve in a series circuit, submerged in a water filled tank with water inside the conductor strands. Voltage is maintained continuously while the cables are load cycled with current to a conductor temperature of 90° C. for eight hours each day. The cables are tested to failure and the data analyzed by Weibull statistics. The results are represented as α, the mean time for 63.5% failure probability and β, the statistical spread in the data. Although the correlation of actual service life with the data derived from this test has not been quantified, it is generally agreed by those skilled in the art that a cable system with an improved test performance i.e. longer time to failure, will also carry over into its field performance reliability and extension of life.

The susceptibility of the insulation composition to water tree growth was tested on moulded samples of the same. This laboratory material test utilised compression moulded dish shaped specimens with built-in protrusion defects of 20 micrometer tip radius. The experimental design and test procedure is identical to that described in aforesaid Canadian patent application No. 2,039,894. Tests at an insulation temperature of 65° C. were also carried out to simulate the operating conditions of a commercial size cable. Dielectric loss measurements on pressed and cross-linked plaques were also carried out in parallel to cable measurements.

Under no circumstances was it considered permissible to realize enhanced resistance to moisture induced degradation behaviour at the expense of other properties relevant to service behaviour and operational reliability.

Commercially available insulation compound HFDA 4202 supplied by Union Carbide Chemicals and meeting the cleanliness requirements as specified by AEIC was used for comparisons. This compound is based on the disclosure in U.S. Pat. No. 4,144,202 and believed to contain approximately 5% w/w of a silane of the formula $C_6H_5CH=N(CH_2)_3Si(OCH_2CH_3)_3$ Results The results illustrate how a cross-linked synergistic specific EVA(OH) terpolymer and a hindered amine in polyethylene renders the resulting composition more resistant to moisture induced degradation of its electrical properties thereby resulting in a cable of improved reliability. All compositions and results are described in the following examples.

EXAMPLE 1

Insulation Composition:

| Components | % w/w |
|---|---|
| Polyethylene | 92.6 |
| EVA(OH) | 5 |
| Irganox 1035 | 0.15 |
| Irganox 802 | 0.35 |
| Dicumyl peroxide | 1.9 |

The number density of the contaminants of different sizes in this compound was measured using a Intec Laser Inspection system and found to comply to the AEIC cable requirements. The typical values were:

| | Defects/cu.in of Example 1 | | |
|---|---|---|---|
| A (<2 mil) | B (2–5 mil) | C (5–10 mil) | D (>10 mil) |
| 0.13 | 0.65 | 0.06 | 0.003 |

A 15 kV rated cable with this compound as insulation and commercially available semiconductive shield compounds (AT plastics Compounds AT 377 and AT389) was extruded onto a 1/0 AWG (19 wires) compressed Aluminium conductor. Concentric neutrals were then laid on these cables. A reference cable with HFDA 4202 as insulation was also simultaneously extruded.

Accelerated Cable Life Tests with Example 1

These cables were tested in water filled tanks using the following experimental parameters.

(1) Test voltage $4 \times V_g$ (35 kV; average stress of 200 volts/mil).
(2) Test frequency 60 Hz.
(3) Load cycling with 90° C. conductor temperature in air, 8 hours on and 16 hours off load cycle.
(4) Tank water temperature maintained at 50° C.±1.0.
(5) Ten 30 ft cable samples wound into 2 loops (2×360 with an active length of 25 ft in each water tank.
(6) Cable strands and tanks filled with deionised water.
(7) Tests conducted until samples fail with 4 were used to measure the residual breakdown strength after aging.

Seven out of 12 sample population with Example 1 as insulation, failed within 1600 hours (66 days) of test time and there were no failures among cables with HFDA 4202 as insulation. The failure data is as reported below:

| Cable Failure Data with Example 1 | | |
|---|---|---|
| Sample No. | Time to fail (hours) | Comment |
| 1 | 350.7 | failed in air 19" above water |
| 12 | 1142.2 | failed 18" below water |

-continued

Cable Failure Data with Example 1

| Sample No. | Time to fail (hours) | Comment |
|---|---|---|
| 8 | 1370.9 | failed in air 3" above water |
| 4 | 1545.5 | failed in air 13" above water |
| 2 | 1545.9 | failed 12" below water |
| 11 | 1551.4 | failed 41" below water |
| 15 (replacement) | 609.9 | failed 41" below water |

The data was analyzed using Weibull statistics to yield the parameters α (63.5% failure probability) as 1300.4 hours and β (measure of the spread) as 2.96. For the first three failures, cable sections close to breakdown sites revealed a large number of bow-tie trees in the 2–5 mil size range with no vented trees. The average breakdown strength of the virgin cables with Example 1 as insulation was 1032 volts/mil exceeding the AEIC specification. However, after 1600 hours of accelerated test in water filled tanks, this dropped to a value of 400 volts/mil. On the contrary the reference cable retained 85% of its original value of 1030 volts/mil for its breakdown strength. The average failure time of cable with Example 1 insulation was equivalent to that of a conventional unmodified XLPE cable. It should be noted that the addition of EVA(OH) of 95% hydrolysis did not result in any improvement in the resistance to moisture induced degradation.

AEIC Qualification Tests with Example 1

The cable with Example 1 was also tested as per AEIC qualification test procedures. Several anomalies were observed.

(1) The cable insulation did not render itself transparent in hot oil at 120° C. and thus it was not possible to examine cable interfaces. The insulation became even more opaque than at room temperature, which indicates structural and morphological incompatibility of terpolymer with polyethylene.

(2) With an applied voltage of 13.0 kV, the dissipation factors measured at ambient temperature and at 130° C. were, respectively, 0.14% and 2.64%, with the latter far exceeding the specification of 0.5% maximum.

(3) The a.c. breakdown strength after 120 days of accelerated water tree aging was 540 volts/mil with a very large number of non-vented water trees.

These results confirm that the terpolymer of higher degree of hydrolysis did not enhance the insulation resistance to moisture induced degradation as tested by the industry standards and hence not useful for actual service applications. At the concentrations used in Example 1, it is not structurally compatible with polyethylene.

Moulded Plaque Tests with Example 1

Accelerated water tree growth studies were conducted using moulded and cross-linked plaques of Example 1 at ambient temperature and at 65° C. The size of water trees was measured after a fixed test time. HFDA 4202 was used as reference sample against which comparisons were made:

| Sample | Water tree size (micrometers) at 65° C. 2300 hrs test | at ambient temperature 1500 hrs test |
|---|---|---|
| HFDA4202 | 405 | 460 |
| Example 1 | 330 | 500 |

These results clearly show the water tree retardancy inherent in the composition of Example 1. Yet further, they demonstrate a superiority over the HFDA 4202 at 65° C. test temperature.

Thus, the results obtained for the composition of Example 1 teach the following:

1. An improved cable with enhanced resistance to moisture induced degradation is not self-evident from a water tree retardant composition as judged from moulded plaque tests alone.

2. EVA(OH) terpolymer of very high degree of hydrolysis, such as the one used in Example 1 from 95% hydrolysis, is structurally incompatible with polyethylene and renders it opaque at temperatures required for cable defect examination. This examination step, therefore, is thus not possible and hence a cable with such insulation cannot be certified for improved service reliability. This is reinforced further by the Examples described hereinbelow, wherein EVA(OH) of higher hydrolysis is totally unsuitable for cable applications at any concentration level;

3. EVA(OH) of higher hydrolysis when used at 5% w/w level, also increases the dielectric loss of the XLPE insulation to an unacceptable level; hence its use at concentrations >5% is simply out of utility specification.

Further modifications were therefore necessary to make the composition highly useful for practical service applications.

Improvement in Transparency and Dielectric Loss

In view of the importance and necessity of a transparent XLPE insulation, the compatibility of EVA(OH) with PE was examined by employing 5 mm plaques of Examples 2–5. The details of the embodiments of these compositions with the test data are presented hereinbelow.

EXAMPLES 2–5

| Components | Example 2 (% w/w) | Example 3 (% w/w) | Example 4 (% w/w) | Example 5 (% w/w) |
|---|---|---|---|---|
| Polyethylene | 95.4 | 96.4 | 95.4 | 92.4 |
| EVA(OH) | 2 | 1 | 2 | 5 |
| Irganox 1035 | 0.15 | 0.15 | — | — |
| Irganox 802 | 0.35 | 0.35 | — | — |
| Irganox 245 | — | — | 0.2 | 0.2 |
| Chimasorb 944 | — | — | 0.3 | 0.3 |
| Dicumyl peroxide | 1.9 | 1.9 | 1.9 | 1.9 |
| Transparency hot oil test | opaque cloudy | opaque cloudy | transparent | opaque cloudy |
| Dielectric loss (%) @ 2 kV/mm | | | | |
| @ 130° C. | 1.45 | 0.56 | 0.54 | 1.40 |
| @ 90° C. | 0.72 | 0.21 | 0.22 | 0.63 |

Examples 2 and 3 are similar to Example 1 except for the EVA(OH) concentration in the compositions. In Examples 4 and 5, an EVA(OH) terpolymer with 40% hydrolysis, also supplied by Tosoh, Japan, was used; Irganox 245 is a hindered phenolic ester and Chimasorb 944 is AO-4 a hindered amine, both supplied by Ciba Geigy.

Surprisingly, it was found that EVA(OH) of higher hydrolysis was not useful in any concentration range studied, notwithstanding the dielectric loss of the composition containing 1% EVA(OH), Example 3, may come close to the specification requirements as shown above. On the contrary, EVA(OH) of 40% hydrolysis used at 2% w/w concentration as in Example 4 rendered the XLPE optically transparent in hot oil test. This surprising result on the physical compatibility and, hence, the transparency of the insulation composition sets a limiting value for the percentage hydrolysis of the terpolymer to be used as 40%. In addition, to meet the electrical requirement it can only be used at or below 2% w/w concentrations. The latter is evident from the data on dielectric loss as given above.

Synergistic Effect of EVA(OH) and Hindered Amine on Water Tree Growth

Three types of tests were carried out to elaborate on the surprising effect of synergism between EVA(OH) terpolymer and hindered amine. Moulded plaque tests for accelerated water tree growth were carried out with the following test conditions:

Test Conditions
1. 6 kV,1 kHz,0.1M NaCl, 1500 hrs at RT
2. 6 kV,1 kHz,0.1M NaCl, 2300 hrs at 65° C.
3. 6 kV,1 kHz,0.1M NACl, $CuSO_4.5H_2O$ and $(NH_4)_2S_2O_8$, 1000 hrs at ambient temperature The details of the embodiments of the test compositions are given below. EVA(OH) of 95% hydrolysis was used in all:

EXAMPLES 6-7

| Components | Example 1 (% w/w) | Example 6 (% w/w) | Example 7 (% w/w) |
|---|---|---|---|
| Polyethylene | 92.6 | 92.6 | 92.1 |
| EVA(OH) | 5 | 5 | 5 |
| Irganox 1035 | 0.15 | — | 0.15 |
| Irganox 802 | 0.35 | — | 0.35 |
| Irganox 245 | — | 0.2 | — |
| Chimasorb 944 | — | 0.3 | 0.5 |
| Dicumyl peroxide | 1.9 | 1.9 | 1.9 |
| Water tree size (micrometers) | Example 1 | Example 6 | Example 7 |
| Test condition 1 | 500 | 170 | NA |
| Test condition 2 | 330 | 130 | NA |
| Test condition 3 | 380 | — | 220 |

The results obtained above show that the addition of Chimasorb 944 resulted in smaller, water tree size for the same type and concentration of EVA(OH), proving the additional moisture degradative stability offered by the hindered amine. Although the mechanism for this synergistic effect is not known, and not being bound by theory, the observed smaller water tree size could be related to lower degree of oxidative degradation due to the combined action of moisture, ions, electric stress and temperature. This enhancement in the resistance to water tree growth through the use of an hindered amine in electrical insulation is most surprising.

Cable Tests Using the Insulation Composition of the Present Invention

The final test composition was that of Example 4 because the addition of EVA(OH) with 40% hydrolysis at 2% w/w level to polyethylene had rendered the insulation transparent and limited the dielectric loss within the specification requirements and because of the unexpected synergism between EVA(OH) and hindered amine. The compound was produced to the same cleanliness standards as of Example 1, which did not convincingly demonstrate any improvement in the resistance to moisture induced degradation in full size cable tests. A 15 kV rated cable with this compound as insulation and commercially available semiconductive shield compounds (AT plastics Compounds AT 377 and AT389)was extruded onto a 1/0 AWG (19 wires) compressed aluminium conductor. Concentric neutrals were then laid on these cables. These cables were used for AEIC qualification tests. A second 15 kV cable with the same materials, but on to #2 AWG (7 strands) aluminium conductor was extruded for life tests. A reference cable with HFDA 4202 as insulation was also simultaneously extruded.

Accelerated Cable Life Tests with Example 4

The test conditions were as follows.
(1) Test voltage $4 \times V_g$ (35 kV; average stress of 200 volts/mil).
(2) Test frequency 60 Hz.
(3) Load cycling with 90° C. conductor temperature in air and 8 hours on and 16 hours off load cycle.
(4) tank water temperature maintained at 50° C.±3.0.
(5) twelve 16 ft cable samples wound into 1 loop (1×360) with an active length of 13 ft in each water tank.
(6) Cable strands and tanks filled with water of initial resistivity of >200 Kohm.cm
(7) Tests conducted until all samples fail.

In this series of tests the entire cable population insulated with HFDA 4202 failed before 270 days, with the initial failure occurring after 173 days. The failure data for this cable was as follows:

| Sample No. | Time to fail (days) | Comment |
|---|---|---|
| 9 | 173.5 | failed 8" below water |
| 3 | 178.5 | failed 28" below water |
| 10 | 192 | failed 12" below water |
| 12 | 196 | failed 28" below water |
| 4 | 200.8 | failed 5" below water |
| 7 | 213.3 | failed 18" below water |
| 6 | 218.8 | failed 22" below water |
| 8 | 221.6 | failed 17" below water |
| 1 | 226.3 | failed at water-line |
| 11 | 241 | failed 26" below water |
| 2 | 250.8 | failed 27" below water |
| 5 | 268.6 | failed 27" below water |

The statistical analysis of the failures in HFDA 4202 insulated cable yielded the values for the parameters $\alpha$ (63.5% failure probability) as 227.8 days and $\beta$ (spread) as 8.01. The first true failure among cable population insulated with the composition of the present invention occurred after 291 days of testing. The test data, with real size cable test although still not complete at the time of this application, establishes the superiority of the cable performance with reference to the commercially available insulation system.

AEIC Qualification Tests with Example 4

The cable with Example 4 as insulation was also tested as per the procedures under this qualification test and the improvements in terms of enhanced resistance to moisture induced degradation were confirmed:

(1) The cable insulation rendered itself transparent enabling the physical and microscopic examination of the semiconductive interface. This reassures the claim made based on the plaque test for the compatibility of EVA(OH) of lower hydrolysis with polyethylene.

(2) The dielectric loss factors were measured with an applied voltage of 8.8 kV at ambient temperature, 90° C. and 130° C. Conductor temperatures were, respectively, 0.021%, 0.130% and 0.200% and below the 0.5% requirement. This reinforces the claims made hereinbefore through the plaque tests.

(3) There was an observed 64% retention on the a.c. breakdown strength after accelerated water tree tests.

Although this disclosure has described and illustrated a preferred embodiment of the invention, it is to be understood that the invention is not restricted to both particular embodiments which are functional or mechanically equivalents of the specific embodiment and features that have been described and illustrated.

I claim:

1. An electrically insulating optically transparent cross-linked polyethylene composition for use in high voltage electrical cables, said cross-linked polyethylene being obtained by cross-linking a composition consisting essentially of 95.4% w/w of a low density, peroxide cross-linkable polyethylene, 1–2% w/w of a terpolymer of ethylene, vinyl acetate and vinyl alcohol, 0.2% w/w hindered phenolic ester, 1.9% w/w of a peroxide and 0.3% w/w of a sterically hindered amine stabiliser; said terpolymer being obtained from about 40% hydrolysis of an ethylene-vinyl acetate copolymer having a 20–30% w/w vinyl acetate content; and wherein said polyethylene and said terpolymer have substantially the same melt index, said sterically hindered amine being poly-{[6-(1,1,3,3-tetramethylbutyl)-imino]-1,3,5-triazine-2,4-diyl][2-(2,2,6,6-tetrametylpiperidyl)-amino]-hexamethylene-[4-2,2,6,6-tetramethylpiperidyl)-imino]}.

2. A composition as claimed in claim 1 wherein said ethylene-vinyl acetate copolymer has a vinyl acetate content of about 25% w/w.

3. A high voltage electrical cable comprising an electrical conductor and an electrically insulating cross-linked polyethylene composition as claimed in claim 2.

4. An electrically insulating optically transparent cross-linked polyethylene insulating composition for use in high voltage electrical cables, said cross-linked polyethylene being obtained by cross-linking a composition consisting essentially of 95.4 w/w of a low density, peroxide cross-linkable polyethylene, 2% w/w of a terpolymer of ethylene, vinyl acetate and vinyl alcohol, 0.2% w/w hindered phenolic ester, a peroxide cross-linking agent and 0.3% w/w of a statically hindered amine stabiliser; said terpolymer being obtained from about 40% hydrolysis of an ehtylene-vinyl acetate copolymer having a 20–30% w/w vinyl acetate content; and wherein said polyethylene and said terpolymer have substantially the same melt index, said composition being transparent, said sterically hindered amine being poly-{[6-(1,1,3,3-tetramethylbutyl)-imino]-1,3,5-triazine-2,4-diyl][2-(2,2,6,6-tetrametylpiperidyl)-amino]-hexamethylene-[4-2,2,6,6-tetramethylpiperidyl)-imino]}.

* * * * *